Patented Mar. 18, 1930

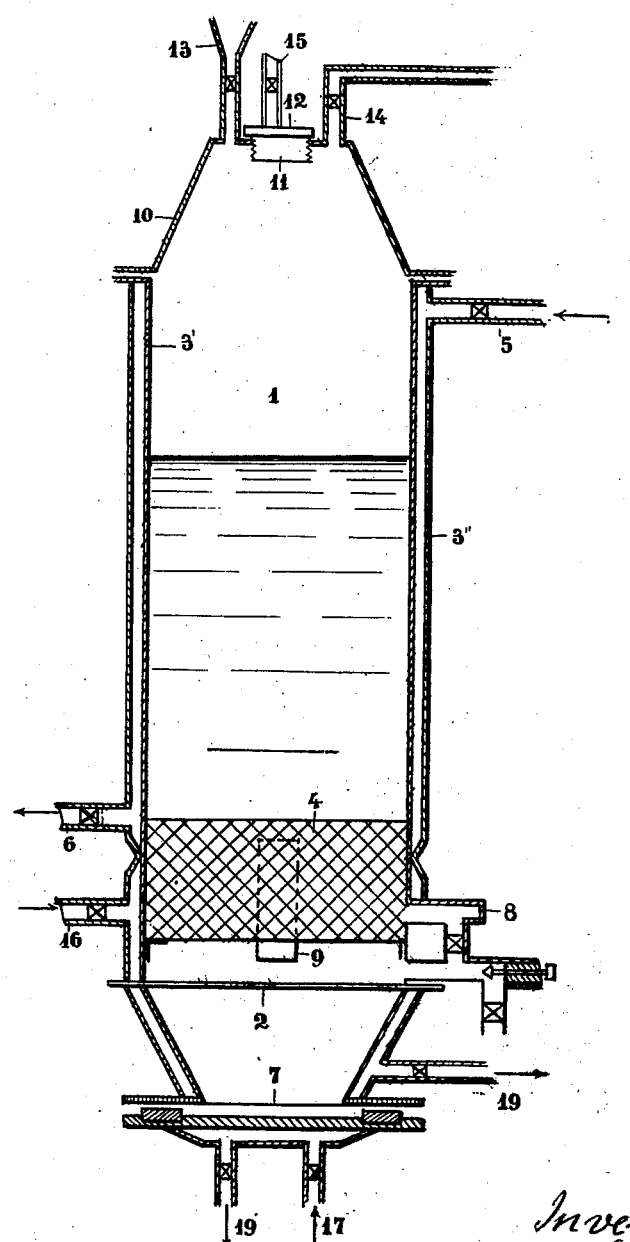

1,751,211

UNITED STATES PATENT OFFICE

OVIDIO LEONORI, OF NARNI, ITALY

PROCESS FOR PRODUCING ANHYDROUS ALCOHOL

Application filed June 9, 1927, Serial No. 197,769, and in Italy June 26, 1926.

Industrially produced alcohol always contains a certain quantity of water, and for those uses where anhydrous alcohol is required, a dehydrating process is necessary which is costly and difficult.

The present invention concerns an industrially practicable process for obtaining the complete dehydration of alcohol, when the latter is to be mixed in a stable and perfect manner with benzine, petrol, heavy oil, liquid and solid hydrocarbons of the eliphatic and aromatic series, both for forming carbureting mixtures, such as are used in internal combustion engines and for producing solvents of resins, lacs, cellulose, guttapercha, rubber and similar substances.

The new process is such that the dehydrated alcohol obtained thereby is not only completely anhydrous, but is further enriched with synthetic products which remain dissolved in it during the treatment and which increase its calorific power adding to it other desirable qualities.

The process consists substantially in the preliminary treatment of alcohol containing water with gaseous ammonia, till the complete saturation of the water is obtained, and in then letting react on said water a mixture of carbides and hydrides capable of being decomposed in the water in such quantity as to bind all the water present, then separating the anhydrous alcohol from the precipitate by decanting and finally clarifying by means of a weak electric current which liberates the liquid from all the extremely attenuated solid particles suspended therein and rendering it turbid. The aforesaid operations are all carried out so as not to cause any loss of the materials employed, while all the products of the reactions are recovered.

In practice the process is carried out in the following manner, the annexed drawing showing diagrammatically, by way of example, a sectional view of a device for affecting the dehydration of alcohol according to my invention.

The usual commercial alcohol containing from about 5% to 20% of water, is treated with gaseous ammonia so as to completely saturate, at the normal temperature, the water which it contains. For this treatment gaseous ammonia is employed instead of ammonia in solution so as not to increase the quantity of water contained in the alcohol. Then, the alcohol, saturated with ammonia, is placed in contact with a mixture, in due proportions, of carbide of calcium and other carbides decomposable in water, such as, for example, the carbides of aluminum, barium, manganese, sodium etc. to which carbides may be added a small quantity of hydrides of aluminum and calcium.

The treatment with carbide of calcium alone is old, but the addition of other carbides and of the aforesaid hydrides will produce effects unobtainable by the use of carbide of calcium alone. In fact, some carbides, e. g. carbide of aluminum, have a peculiar coagulating and purifying action of their own; other carbides, e. g. carbide of manganese, cause the formation of synthetic products both in the decomposition of the carbide itself and through the action of various gases in the nascent state which develop from the reaction. For instance, the object of the addition of the hydrides of calcium and of aluminum is the production of hydrogen in the nascent state.

Coming in contact with the water contained in the alcohol, the said carbides and hydrides are decomposed, forming different gases, such as acetylene, ethylene, methane and hydrogen, which act on the liquid in the nascent state.

In the first place, there is a dehydrating and coagulating action, due to the formation of hydroxides of calcium, aluminum etc., and at the same time a catalytic action exerted by the metallic carbides on the nascent gases, acetylene, ethylene, methane and hydrogen thus enriching the alcohol with liquid products of a high calorific power, which improve its qualities as a fuel; on the other hand, the solubility of the acetylene in the alcohol is diminished, so that it is dissolved in the liquid in not excessive quantities. Moreover, its presence tends to diminish the hygroscopicity of anhydrous alcohol.

The above described reaction takes place rapidly at the ordinary temperature, but it may be hastened by a slight heating of the alcohol to a temperature between 30 and 40 degrees contigrade.

For this purpose it is advisable to make use of a closed cylindrical vessel shown at 1 in the drawing, having a conical bottom 2 and double walls 3, 3′ so as to allow the circulation of hot water or steam. On the conical bottom is placed a basket 4 of perforated plate or a metal net containing the mixture of carbides and hydrides as aforesaid. The heating apparatus has two opening, 5, 6 for the inlet and the outlet of the steam; the conical bottom has a discharge opening 7 in order to free the cylinder from the accumulating deposit; the said cylinder is provided with three or more discharge cocks at various heights, one cock being shown at 8 for the purpose of decanting the alcohol above the deposit, and moreover has a little glass window 9 in its side in order to observe the level of the muddy deposit. The cylinder is closed on the top by a movable lid 10, which is taken off to introduce or remove the basket. The lid has an opening 11 adapted to be closed by a screw stopper 12 to introduce the mixture of carbides and hydrides. A funnel 13 is provided in the lid for the introduction of the alcohol and a tube 14 for the escape of the acetylene and the other gases which are formed, and which, after first passing through a refrigerating apparatus where the alcohol vapours are condensed and through a common washing apparatus where they are deprived of their ammonia, reach a meter from which they are collected in the bell of a gasometer. The lid of the receptacle is also furnished with another tube 15 for the escape of alcohol vapours, as will be explained hereafter.

The complete dehydration is accomplished in about half an hour, and the presence of the ammonia saturating the water contained in the alcohol has the effect of eliminating those substances, such as sulphurated hydrogen, phosphorated hydrogen and the like, which are developed in the reaction by reason of the impurities contained in the carbides used, and which would inquinate the gases arising from the reaction. The ammonia has also the action of facilitating the disintegration of the deposits consisting of finely shredded metallic hydrates.

In order to obtain the complete separation of these hydrates and consequently a complete limpidity, the alcohol, after being rendered anhydrous and enriched is decanted through one of the cocks provided in the side of the cylinder and is poured into a receptacle for its clarification, wherein, as a further precaution, is placed another basket with the same mixture of carbides as contained in the dehydration recipient, so as to thoroughly ensure the elimination of any trace of water; into this clarifying vessel are introduced small quantities of alcohol derived from the condensation of the vapours carried away by the gases of the reaction.

The residuum in the dehydrating vessel still contains a considerable quantity of anhydrous alcohol. In order to recover it, after the decanting of the overlying liquid, steam is introduced through the tubes 16 and 17 into the lower portions of the heating jacket from which the condensed steam is discharged through the outlet tubes 18 and 19, the deposit is brought to the temperature at which alcohol distils. The vapours of alcohol which develop from the dehydration vessel are led through the tube 15 into a purifying vessel, wherein they first traverse a layer of the same mixture of carbides which had served for the dehydration and are then condensed and collected in the clarifying vessel, mingling with the decanted alcohol and with that derived from the condensation of the vapours which escaped together with the reaction gases.

Anhydrous alcohol thus collected in the clarifying vessel is always slightly turbid, because it still contains very small particles of metallic hydroxides in a state of suspension which do not deposit, nor can be separated by ordinary filtering or by means of pressure. It is possible, however, to eliminate them rapidly and to render the liquid mass perfectly limpid, by having recourse to precipitation. It is sufficient for the purpose to dip into the liquid two electrodes communicating with the opposite poles of a battery of a few elements, and in a few minutes a complete clarification is obtained, all the particles depositing on the cathode.

The alcohol, perfectly limpid, thus obtained, is absolutely anhydrous, and may be mixed with benzine, benzol, hydronaphthalene and other hydrocarbons of the eliphatic or aromatic series, light or heavy according to the use for which it is meant; and the alcohol has the characteristics required, either as fuel for internal combustion motors or as a solvent for resins, lacs, cellulosic ethers, rubber, etc.

The above described process may be advantageously applied in order to render perfectly anhydrous all alcohols of the fatty series, and more especially methylic alcohol, ethylic, propylic, butilic, amilic, etc., however obtained. The said process further permits the recovery and utilization of all the materials employed therein, such as ammonia, acetylene and other gases, hydrates, etc., so that the sale of the by-products covers the cost of the dehydration of the alcohol.

I claim:

1. The process of producing anhydrous alcohol to be used principally in the preparation of fuels and solvents, which consists in treating aqueous alcohol with a mixture of metallic carbides decomposable by water, and hydrides of calcium and aluminum.

2. The process of producing arhydrous alcohol as specified in claim 1, in which, as a preliminary step, the water contained in the alcohol is saturated with gaseous ammonia.

3. The process of producing anhydrous alcohol as specified in claim 1, in which as a preliminary step, the water contained in the alcohol is saturated with gaseous ammonia, and the acetylene and other gases formed by the reaction, are collected after passing through a washing apparatus for the purpose of recovering by condensation the vapours of alcohol escaping together with said gases.

4. The process of producing anhydrous alcohol which consists in causing the aqueous alcohol, the water of which is saturated with gaseous ammonia, to react with a mixture of metallic carbides decomposable by water, and hydrides of calcium and aluminum, and finally heating after the decanting of the dehydrated alcohol, the residuary deposit for distilling therefrom the alcohol which it contains, and passing the vapours of said alcohol through a layer of carbides.

In testimony whereof I have affixed my signature at Rome this 25th day of May, 1927.

OVIDIO LEONORI.